United States Patent [19]

Whelan

[11] 3,806,607

[45] Apr. 23, 1974

[54] CHOCOLATE FLAVORED BEVERAGES CONTAINING COCOA AND DIOCTYL SODIUM SULFOSUCCINATE

[75] Inventor: Kenneth Whelan, Suffern, N.Y.

[73] Assignee: American Cyanamid Company, Stamford, Conn.

[22] Filed: Dec. 28, 1970

[21] Appl. No.: 102,187

Related U.S. Application Data

[63] Continuation-in-part of Ser. No. 853,982, Aug. 28, 1969, Pat. No. 3,560,218, which is a continuation-in-part of Ser. No. 576,204, Aug. 31, 1966, abandoned.

[52] U.S. Cl................................. 426/172, 426/185
[51] Int. Cl............................................. A23g 1/00
[58] Field of Search........................... 99/23–26, 78

[56] References Cited
UNITED STATES PATENTS 3,560,218   2/1971   Whelan................................. 99/25
3,486,905   12/1969   Hotelling............................... 99/25

Primary Examiner—David M. Naff
Attorney, Agent, or Firm—Norton S. Johnson

[57] ABSTRACT

Chocolate flavored beverages are provided comprising a liquid beverage vehicle, and readily dispersible cocoa compositions containing from 0.05 to 0.75% by weight dioctyl sodium sulfosuccinate. The cocoa compositions can be prepared by mixing cocoa powder with a solvent solution containing the desired amount of dioctyl sodium sulfosuccinate, and then drying the mixture to evaporate the solvent. The cocoa compositions are dispersed in a liquid beverage vehicle to provide flavored beverages containing 10 to 100 parts of dioctyl sodium sulfosuccinate per million parts of beverage.

6 Claims, No Drawings

CHOCOLATE FLAVORED BEVERAGES CONTAINING COCOA AND DIOCTYL SODIUM SULFOSUCCINATE

This application is a continuation-in-part of my co-pending application Ser. No. 853,982, filed Aug. 28, 1969, now U.S. Pat. No. 3,560,218, which is, in turn, a continuation-in-part of my earlier filed application Ser. No. 576,204, filed Aug. 31, 1966, now abandoned.

This invention relates to cocoa compositions having improved qualities of dispersion. More particularly, the invention relates to readily dispersible cocoa compositions containing dioctyl sodium sulfosuccinate, reconstitutable chocolate drink products prepared from the cocoa compositions, and to chocolate flavored beverages containing the cocoa compositions or reconstituted chocolate drink products dispersed in a suitable liquid medium.

Cocoa is obtained from the roasted, cured kernels of ripe seeds of Theobroma Cacao Linne, and other species of Theobroma. The roasted kernels are ground to a smooth paste to produce plain chocolate having a high fat content and the chocolate is then passed through filter presses to remove part of the fat, and thereafter the resulting press cake is pulverized to obtain a fine cocoa powder.

The cocoa powder is brownish in color having a chocolate odor and taste, and can be used directly as a food stuff or as a flavoring agent. A reconstitutable chocolate drink product, for example, is prepared essentially from cocoa powder and a sweetening agent. The chocolate drink product may also include other ingredients as milk solids, vitamins, iron salts, or other flavoring agents such as ground spice, vanilla bean, vanillin, coumarin, salt, and the like.

Cocoa powder, however, is an inherently difficult material to disperse in a liquid medium, particularly cold water or milk, and has a slow rate of solution because the oily cocoa particles tend to agglomerate and form clumps that float on the surface and resist wetting by the liquid. Violent agitation or mechanically breaking up the floating cocoa is necessary to blend the cocoa particles with the liquid which is both time consuming and inconvenient to the consumer.

In the past, therefore, many wetting or dispersing agents have been compounded with the cocoa particles to improve their dispersion qualities in cold water or milk. Lecithin, for example, one of the most effective dispersing agents for cocoa, has long been used with cocoa powder in the preparation of reconstitutable chocolate drink products, but its effectiveness as a dispersant is very short lived and, consequently, lecithinated cocoa has a very short shelf life. Other common food surfactants which may be more stable than lecithin, such as sorbitan monopalmitate, propylene glycol monostearate, and the like, have also been used with cocoa powder, but these surfactants are limited in effectiveness compared to lecithin and have generally proven too costly for widespread commercial acceptance.

The compounding of the cocoa powder with sugar in the preparation of reconstitutable chocolate drink products, tends to reduce agglomerate formation somewhat by separating the cocoa particles but the necessity of using sugar to achieve increased dispersibility has, to a large extent, prevented the successful formulation of a dietetic reconstitutable chocolate drink product.

It is therefore a primary object of this invention to provide a new and improved chocolate flavored beverage containing a readily dispersible cocoa composition which does not agglomerate in the liquid medium of the beverage.

Another object of this invention is to provide a readily dispersible cocoa composition for use in the preparation of reconstitutable chocolate drink products that has an increased rate of dispersion over prior art chocolate drink products when dissolved in cold water or milk.

Additional objects and advantages will be set forth in part in the description which follows and in part will be obvious from the description or may be learned by practice of the invention, the objects and advantages being realized and attained by means of the compositions, processes, and improvements particularly pointed out in the appended claims.

To achieve the foregoing objects and in accordance with its purpose, the invention as embodied and broadly described provides a chocolate flavored beverage comprising a liquid beverage vehicle, a readily dispersible cocoa composition containing cocoa powder having a fat content of from less than 10 to more than 22% and from about 0.05 to 0.75% dioctyl sodium sulfosuccinate based on the weight of the cocoa, the dioctyl sodium sulfosuccinate comprising from about 10 to 100 parts per million parts of beverage.

It has been found that the dioctyl sodium sulfosuccinate acts as a stabilizer for the beverage effective to markedly reduce precipitation and fragmentation of the fat content of the cocoa base upon storage and agitation of the beverage.

Thus, the invention as embodied and broadly described provides a chocolate flavored beverage composition comprising a liquid beverage vehicle, a cocoa base having a fat content of from less than 10 to more than 22%; and a stabilizer for the beverage effective to markedly reduce precipitation and fragmentation of the fat content of the cocoa base upon storage and agitation of the beverage, the stabilizer comprising from about 10 to 100 parts of dioctyl sodium sulfosuccinate per million parts of beverage.

Preferably, the stabilizer comprises from about 25 parts to about 50 parts of di-(2-ethyl hexyl) sodium sulfosuccinate per million parts of the beverage.

It is also preferred that the beverage vehicle comprises an aqueous suspension of milk solids or water.

It is to be understood that both the foregoing general description and the following detailed description are exemplary and explanatory but are not restrictive of the invention.

The cocoa powders that are useful in preparing the cocoa compositions used in the beverages of this invention are generally classified into three (3) categories on the basis of their fat content. Breakfast cocoa, or high fat cocoa, for example, generally contains above about 22% fat; cocoa or medium fat cocoa generally about 10 to 22% fat; and low fat cocoa less than about 10% fat. The term "cocoa", therefore, as it is used throughout the specification and claims is intended to include cocoa powder having any fat content.

In accordance with the invention, cocoa compositions are prepared containing a cocoa powder and non-toxic amounts of dioctyl sodium sulfosuccinate as an improved surface active agent for the cocoa. While surface active agents, in general, are known to reduce the surface tension of a liquid in which a substance is dissolved and other surface active agents have been used in the past in attempts to improve the dispersibility of cocoa powder, it has been unexpectedly found that dioctyl sodium sulfosuccinate is far superior in this respect to other surface active agents when used in combination with cocoa powders.

It has been found, for example, that dioctyl sodium sulfosuccinate greatly reduces the tendency of the finely divided cocoa particles to agglomerate, and this inhibition of agglomerate formation results in a far superior rate of dispersion achieved by the cocoa compositions of this invention. Further, it has been found that no loss of effectiveness over extended periods of time and under varying conditions has been observed with the cocoa compositions of this invention.

Cocoa powder, for example, which has been pretreated with dioctyl sodium sulfosuccinate will disperse without agitation when added to water or milk; and even if the liquids are ice cold, the dispersion still takes place readily and does not require stirring.

The concentration of dioctyl sodium sulfosuccinate employed in the present invention is, as hereinabove stated, from about 0.05 to 0.75%, based on the weight of the cocoa; furthermore, the particular concentration employed is dependent on a variety of factors, the most significant of which appears to be the fat content of the particular cocoa utilized in the composition. It has been observed, for example, that with low fat cocoas, effective dispersion is achieved by employing concentrations as low as 0.05%; whereas, high fat cocoas generally require a concentration of at least 0.1%.

In addition to the fat content of the cocoa, other factors determinative of concentration are taste, cost of materials, and the like. Taste constitutes an important factor to be considered, since dioctyl sodium sulfosuccinate has an inherently bitter taste. The absence or presence of particular optional ingredients in the formulation such as flavoring agents and the like, as well as the fat content of the cocoa, since the fat possesses a flavoring effect in addition to its effect on dispersion, will dictate the concentration employed.

Cost of materials also constitutes a factor to be considered, since at certain effective levels of concentration an increase will not materially enhance dispersibility to the degree necessary to warrant the added cost.

It has been found, however, that readily dispersible cocoa powder compositions are best provided using from about 0.1 to 0.75%, by weight of dioctyl sodium sulfosuccinate, based on the weight of the cocoa powder, with the preferred amount being about 0.4% based on the weight of the cocoa. It is also reasonable to assume that concentrations lower than 0.05% may be effective from the standpoint of the costs involved with the development of substantially fat-free cocoa, as the absence of fat would materially lower the concentration of dioctyl sodium sulfosuccinate necessary to achieve a satisfactory dispersion of the cocoa composition.

In accordance with the invention, the cocoa compositions are prepared by intimately mixing the cocoa powder with a dilute solution of dioctyl sodium sulfosuccinate dissolved in a suitable solvent such as water or a non-aqueous solvent, such as isopropanol, ethanol, or the like, particular care being taken not to excessively moisten the cocoa. In addition, care must be exercised in the choice of solvent, since a fat solvent adversely effects dispersibility by causing migration of the fat content of cocoa to the surface of the cocoa particles. After mixing, the mixture is dried to evaporate off the solvent, leaving the desired amount of dioctyl sodium sulfosuccinate intimately dispersed throughout the cocoa powder.

The dispersing mediums which can be used with the cocoa compositions of the present invention are generally those utilized in preparing reconstitutable chocolate drink products, such as water, milk, and the like. The sweetening agents employed in preparing these products may be sugar, dextrose, or an artificial sweetening agent, such as sodium cyclamate, mixtures of sodium cyclamate and saccharin, and the like.

The advent of the present invention results in many beneficial advantages which inure to the art, particularly in the utilization of the cocoa compositions of the present invention in reconstitutable chocolate drink products. Reconstitutable chocolate drink products containing the cocoa compositions of the present invention are readily dispersible without resorting to the necessity of incorporating sugar in the formulation. Therefore, the advent of the present invention enables the formulation of a readily dispersible, dietetic reconstitutable chocolate drink product.

The advent of the present invention also results in greater utilization of high fat cocoa, which is considered to be a better grade of cocoa from such factors as taste and nutritional values, because the particular problem of agglomerate formation with higher fat cocoas has been substantially reduced. In the past, formulators attempted to reduce agglomeration by substituting medium and low fat cocoa in place of high fat cocoa, but while achieving some reduction in agglomerate formation, there was, of course, a corresponding reduction in taste and nutritional value.

To illustrate the invention more specifically, reference is made to the following examples. These examples illustrate the preparation of cocoa compositions and the increase in their rates of dispersion as compared with untreated cocoa powder and cocoa powder treated with other common food surfactants.

The examples are merely illustrative and are not to be understood as limiting the scope and underlying principles of the invention in any way. All parts and percentages referred to herein are by weight, unless otherwise specifically indicated.

EXAMPLE 1

This example illustrates the preparation of the readily dispersible cocoa compositions of the present invention. Furthermore, the example demonstrates the beneficial results of dispersibility as contrasted to untreated cocoa.

A 2 kg. sample of a commercially available cocoa is passed through a No. 1 screen using a Fitzmill. The cocoa is mixed for 10 minutes in a Hobart mixer with 16 ml of a 50% w/v solution of dioctyl sodium sulfosuccinate in aqueous ethanol, diluted to 400 ml with isopropanol. The wet cocoa, which is partially balled, is passed through a No. 16 mesh hand screen and returned to the Hobart mixer for an additional 5 minute mixing. The material is then spread on a papered tray and dried for 19 hours at 80°F. The dried cocoa is then passed through a No. 16 mesh hand screen.

The dispersibility of the above composition is then compared to a portion of the above commercially available cocoa which is untreated and serves as a control. A 20 gm. sample of the above composition is added to 200 ml of tap water at 25°C using a Lightnin stirrer operating at 1,000 rpm. The process is repeated with the exception that the untreated cocoa powder is used. The test results in demonstrating that the cocoa composition of the present invention is completely dispersed in about 5 seconds; whereas, the control requires 40 seconds to achieve complete dispersion.

EXAMPLE 2

This example demonstrates the utilization of the cocoa composition of the present invention in the preparation of a reconstitutable chocolate drink product. Furthermore, the example demonstrates the beneficial results of dispersibility as contrasted to a granulated chocolate drink composition.

The following product compositions are prepared:

|  | A | B |
|---|---|---|
| Cocoa containing 0.4% dioctyl sodium sulfosuccinate | 6 gm. | 7 gm. |
| Powdered milk solids | 16 gm. | 8 gm. |
| Granulated sugar | 28 gm. | 35 gm. |

The above compositions are prepared by employing the cocoa composition prepared in Example 1, and intimately admixing the additional ingredients.

The above compositions are then subjected to a test of dispersibility employing as a control a granulated chocolate drink composition. Three teaspoonsful of each of the above compositions and the commercially available granulated chocolate drink composition are added to 3 separate containers containing 200 ml of cold, 18°–20°C, tap water. The times required to achieve complete dispersion with each of the compositions are set forth in Table 1 below.

Table 1

| Composition A | 20 seconds |
|---|---|
| Composition B | 15 seconds |
| Granulated Chocolate Drink Composition | 120 seconds |

The commercially available granulated chocolate drink composition contains powdered cocoa, non-fat dried milk solids and granulated sugar, the mixture is subjected to granulation to aid in dispersibility.

EXAMPLE 3

This example demonstrates the dispersibility of reconstitutable chocolate drink compositions in different mediums, contrasting the results to a commercially available granulated chocolate drink composition.

The following four (4) compositions are prepared.

|  | A | B | C | D |
|---|---|---|---|---|
| Cocoa powder containing 0.4% dioctyl sodium sulfosuccinate | 20% | 15% | 10% | 10% |
| Granulated non-fat dried milk solids | 30% | 30% | 30% | 40% |
| Granulated sugar | 50% | 55% | 60% | 50% |

The above compositions are prepared by employing the cocoa composition prepared in Example 1, and intimately admixing the additional ingredients.

The four compositions are then tested with regard to dispersibility and lump formation, comparing same to a commercially available granulated chocolate drink composition. A 1 ounce sample of each of the above compositions and the commercial chocolate drink composition are added separately to a cup of cold water, cold milk, hot boiling water, and hot milk, and each are stirred for approximately 20 seconds with a teaspoon.

The test results in demonstrating that each of the above compositions disperses readily in each medium without lump formation; whereas, the commercially available granulated chocolate drink composition did not disperse as readily and demonstrates extensive lump formation at the bottom of the cups which did not break up and disperse with stirring.

EXAMPLE 4

This example demonstrates the preparation of a reconstitutable chocolate drink composition in which an artificial sweetening agent is employed. Furthermore, the example demonstrates a dispersibility superior to a commercially available granulated chocolate drink composition.

The following composition is prepared:

| Cocoa containing 0.4% dioctyl sodium sulfosuccinate | 4 | gm. |
|---|---|---|
| Salt | 0.2 | gm. |
| Artificial Sweetener* | 0.25 | gm. |
| Non-fat milk solids | 10 | gm. |

*The artificial sweetener is composed of 12 parts sodium cyclamate and 1 part sodium saccharin.

The above composition is prepared by employing the cocoa composition prepared in Example 1, and intimately admixing the additional ingredients.

The composition is then tested with regard to dispersibility and lump formation comparing same to a commercially available granulated chocolate drink composition. Three teaspoonsful of the above composition and the granulated chocolate drink composition are added separately to a cup of cold water and cold milk, and are stirred for approximately 20 seconds with a teaspoon. The test results in demonstrating that the above composition disperses readily without lump formation; whereas, the commercially available granulated chocolate drink composition did not disperse as readily, and demonstrates extensive lump formation at the bottom of the cups which did not break up and disperse with stirring.

EXAMPLE 5

This example illustrates the dispersions achieved with a high fat cocoa powder having a fat content of about 23%.

The cocoa compositions are prepared as set forth in Example 1, using isopropanol exclusively as the solvent and varying amounts of dioctyl sodium sulfosuccinate (DDS) based on the weight of the cocoa powder.

A first control solution is prepared containing untreated cocoa powder, and a second control solution is also prepared containing cocoa powder treated with the solvent only.

The results obtained from both spoon stirring the cocoa compositions in water, and by sprinkling the cocoa compositions on the surface of water and permitting them to settle without agitation are set forth in Table 2 below.

Table 2

| % of DSS | Time to Achieve Dispersion (sec.) | |
|---|---|---|
| | Stirring | Settling |
| 0.4 | 15 | 45 |
| 0.2 | 50 | 360 |
| 0.1 | 80 | 11 min. |
| 0.05 | 150 | 20 min. |
| 0.0 | 185 | 50% in 20 min. |
| Solvent | 95 | 14 min. |

EXAMPLE 6

The procedure of Example 5 is repeated in this example using a medium fat cocoa powder having a fat content of about 11%. The results obtained with each cocoa composition in the spoon mixing and settling tests are reported below in Table 3.

Table 3

| % of DSS | Time to Achieve Dispersion (sec.) | |
|---|---|---|
| | Stirring | Settling |
| 0.4 | 20 | 90 |
| 0.2 | 50 | 105 |
| 0.1 | 105 | 120 |
| 0.05 | 125 | 165 |
| 0.025 | 120 | 195 |
| 0.010 | 140 | 300 |
| 0.0 | 180 | 16 min. |
| Solvent | 135 | 285 |

EXAMPLE 7

The procedure of Example 5 is repeated in this example using a low fat cocoa powder having a fat content of about 4%. The results of the spoon mixing and settling tests are set forth in Table 4 below.

Table 4

| % of DSS | Time to Achieve Dispersion (sec.) | |
|---|---|---|
| | Stirring | Settling |
| 0.4 | 11 | 31 |
| 0.2 | 18 | 34 |
| 0.1 | 20 | 59 |
| 0.05 | 23 | 57 |
| 0.025 | 25 | 70 |
| 0.010 | 31 | 75 |
| 0.005 | 34 | 75 |
| 0.0 | 46 | 75 |
| Solvent | 33 | 67 |

EXAMPLES 8–13

In Examples 8-13, aqueous solutions are prepared containing cocoa powder having a fat content of 22–24% and 0.4%, based on the weight of the cocoa, of a surface active agent. The surface active agent is dissolved in isopropanol, the solvent solution is mixed with the cocoa powder, and the mixture then is dried to evaporate off the solvent.

Examples 9–11 are carried out to illustrate the superior performance achieved by using dioctyl sodium sulfosuccinate over other common food surfactants in the cocoa compositions of this invention. A first control solution (Example 12) is prepared from untreated cocoa powder, and a second control solution (Example 13) is also prepared containing cocoa powder treated with the solvent only.

In each example, 10 gram samples of the various cocoa compositions are added to 200 ml of tap water at 25°C using a Lightnin stirrer operating at 1,000 rpm. The time to achieve a substantially complete dispersion is measured in each example, and the results are reported below in Table 5.

Table 5

| Example Number | Surface Active Agent | Dispersion Time (Seconds) |
|---|---|---|
| 8 | Dioctyl Sodium Sulfosuccinate Polyoxyethylene monopalmitate | 31 |
| 9 | Tween 80 (Atlas Chemical Indus., Inc.) Sorbitan Monopalmitate | 43 |
| 10 | Span 20 (Atlas Chemical Indus., Inc.) Fatty Acid Ester of a Polyol | 89 |
| 11 | Arlacel 80 (Atlas Chemical Indus., Inc.) | 143 |
| 12 | None | 478 |
| 13 | Solvent | 298 |

EXAMPLES 14–19

The procedures of Examples 8–13 are repeated in Examples 14–19, except that 5 gram samples of the various cocoa compositions are added to 200 ml of tap water at 25°C and the solutions are stirred by hand with a spoon.

The time to achieve a substantially complete dispersion in each example is reported below in Table 6.

Table 6

| Example Number | Surface Active Agent | Dispersion Time (Seconds) |
|---|---|---|
| 14 | Dioctyl Sodium Sulfosuccinate Polyoxyethylene monopalmitate | 14 |
| 15 | Tween 80 (Atlas Chemical Indus., Inc.) Sorbitan Monopalmitate | 33 |
| 16 | Span 20 (Atlas Chemical Indus., Inc.) Fatty Acid Ester of a Polyol | 44 |
| 17 | Arlacel 80 (Atlas Chemical Indus., Inc.) | 112 |
| 18 | None | 250 |
| 19 | Solvent | 150 |

EXAMPLES 20–25

The procedures of Examples 8–13 are repeated in Examples 20–25 except that 4 gram samples of the various cocoa compositions are sprinkled on the surface of 200 ml of tap water and the compositions are permitted to settle in the water without agitation.

The time to achieve a substantially complete dispersion in each example is reported below in Table 7.

Table 7

| Example Number | Surface Active Agent | Dispersion Time (Seconds) |
| --- | --- | --- |
| 20 | Dioctyl Sodium Sulfosuccinate | 87 |
| 21 | Polyoxyethylene monopalmitate Tween 80 (Atlas Chemical Indus., Inc.) | 241 |
| 22 | Sorbitan Monopalmitate Span 20 (Atlas Chemical Indus., Inc.) | 204 |
| 23 | Fatty Acid Ester of a Polyol Arlacel 80 (Atlas Chemical Indus., Inc.) | 382 |
| 24 | None | >1400 |
| 25 | Solvent | 687 |

The invention in its broader aspects is not limited to the specific details shown and described, and departures may be made from such details without departing from the principles of the invention and without sacrificing its chief advantages.

What is claimed is:

1. A chocolate flavored beverage comprising a liquid beverage vehicle, a cocoa base having a fat content of from about 10 to about 22%; and a stabilizer for said beverage, said stabilizer comprising 32.2 parts of dioctyl sodium sulfosuccinate per million parts of the beverage.

2. A beverage as in claim 1, wherein the beverage vehicle comprises an aqueous suspension of milk solids.

3. A beverage as in claim 1, wherein the beverage vehicle comprises water.

4. A chocolate flavored beverage comprising a liquid beverage vehicle, a cocoa base having a fat content of from about 10 to about 22%; and a stabilizer for said beverage, said stabilizer comprising 42.65 parts of dioctyl sodium sulfosuccinate per million parts of the beverage.

5. A beverage as in claim 4, wherein the beverage vehicle comprises an aqueous suspension of milk solids.

6. A beverage as in claim 4, wherein the beverage vehicle comprises water.

* * * * *

UNITED STATES PATENT OFFICE
CERTIFICATE OF CORRECTION

Patent No. 3,806,607　　　　　　　Dated April 23, 1974

Inventor(s) KENNETH WHELAN

It is certified that error appears in the above-identified patent and that said Letters Patent are hereby corrected as shown below:

On the cover sheet insert -- The portion of the term of this patent subsequent to Feb. 2, 1988, has been disclaimed. -- .

Signed and sealed this 21st day of January 1975.

(SEAL)
Attest:

McCOY M. GIBSON JR.
Attesting Officer

C. MARSHALL DANN
Commissioner of Patents